US008678806B2

(12) United States Patent
Sauter et al.

(10) Patent No.: US 8,678,806 B2
(45) Date of Patent: Mar. 25, 2014

(54) APPARATUS AND METHOD FOR PLY BONDING AS WELL AS MULTI-PLY PRODUCT

(75) Inventors: Jurgen Sauter, Mannheim (DE); Harald Harlacher, Mannheim (DE); Joachim Leonhardt, Mannheim (DE); Thomas Heilemann, Frankenthal (DE)

(73) Assignee: SCA Hygiene Products GmbH, Mannheim (DE)

( * ) Notice: Subject to any disclaimer, the term of this patent is extended or adjusted under 35 U.S.C. 154(b) by 414 days.

(21) Appl. No.: 13/003,598

(22) PCT Filed: Aug. 7, 2008

(86) PCT No.: PCT/EP2008/060389
§ 371 (c)(1),
(2), (4) Date: Jan. 11, 2011

(87) PCT Pub. No.: WO2010/015281
PCT Pub. Date: Feb. 11, 2010

(65) Prior Publication Data

US 2011/0111180 A1 May 12, 2011

(51) Int. Cl.
*B32B 38/06* (2006.01)

(52) U.S. Cl.
USPC ........... 425/209; 428/172; 428/198; 156/209; 492/35; 492/30; 492/56; 162/362

(58) Field of Classification Search
USPC ................... 425/363; 428/172, 198; 162/362; 156/209; 493/403; 492/35, 56, 30
See application file for complete search history.

(56) References Cited

U.S. PATENT DOCUMENTS

| | | | | |
|---|---|---|---|---|
| 3,961,119 | A * | 6/1976 | Thomas | 428/178 |
| 4,000,242 | A * | 12/1976 | Hartbauer | 264/284 |
| 5,846,636 | A | 12/1998 | Ruppel et al. | |
| 6,454,693 | B1 | 9/2002 | Harlacher et al. | |

(Continued)

FOREIGN PATENT DOCUMENTS

| | | | |
|---|---|---|---|
| DE | 20 2007 006 100 | U1 | 7/2007 |
| EP | 0 796 728 | A2 | 9/1997 |

(Continued)

OTHER PUBLICATIONS

International Search Report, dated Jul. 27, 2009, from corresponding PCT application.

*Primary Examiner* — Joseph S Del Sole
*Assistant Examiner* — Lawrence D Hohenbrink, Jr.
(74) *Attorney, Agent, or Firm* — Buchanan Ingersoll & Rooney PC

(57) ABSTRACT

Apparatus for bonding at least two plies of a fibrous web, includes: a first roller having an outer periphery, at least one embossing protuberance provided on the outer periphery; and a second roller having an outer periphery and being elastic at least in a radial direction, the second roller including at least an inner layer and an outer layer that is harder than the inner layer, the second roller together with the first roller forming a nip through which the two plies are to be fed, wherein an embossing element is located on top of at least one of the embossing protuberance(s), an embossing area of each embossing element being smaller than an embossing area of the corresponding embossing protuberance(s) so that the two plies are bonded at discrete locations corresponding to the first and second embossing elements. Multi-ply product including the bonded plies and corresponding method are also described.

19 Claims, 4 Drawing Sheets

(56) References Cited

U.S. PATENT DOCUMENTS

| | | | | |
|---|---|---|---|---|
| 6,656,569 | B1 * | 12/2003 | Roussel et al. | 428/154 |
| 7,413,630 | B2 | 8/2008 | Graff et al. | |
| 2005/0034828 | A1 * | 2/2005 | Graff et al. | 162/123 |
| 2005/0170145 | A1 | 8/2005 | Biagiotti et al. | |
| 2006/0070714 | A1 * | 4/2006 | Perini | 162/362 |
| 2006/0283538 | A1 * | 12/2006 | Schulz et al. | 156/219 |
| 2007/0254792 | A1 * | 11/2007 | Mizumoto | 492/53 |

FOREIGN PATENT DOCUMENTS

| | | | |
|---|---|---|---|
| EP | 0 765 215 | B1 | 3/1999 |
| EP | 1 029 657 | A1 | 8/2000 |
| EP | 1 155 815 | A1 | 11/2001 |
| EP | 1 216 818 | A2 | 6/2002 |
| EP | 1 319 748 | A1 | 6/2003 |
| WO | 99/33646 | A1 | 7/1999 |
| WO | 2006/136186 | A1 | 12/2006 |

* cited by examiner

Fig. 4a
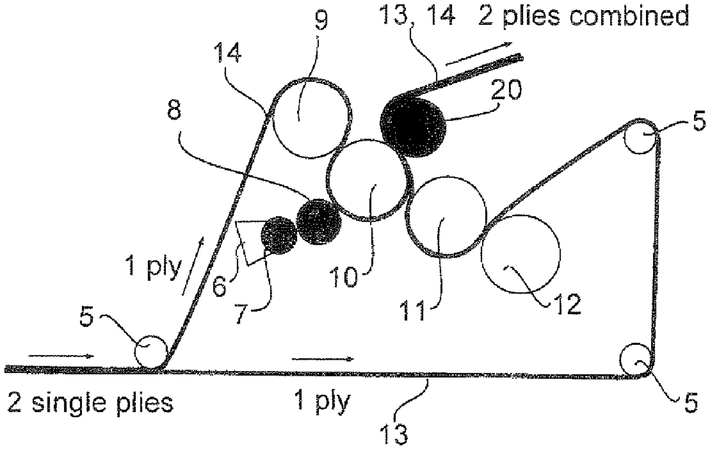
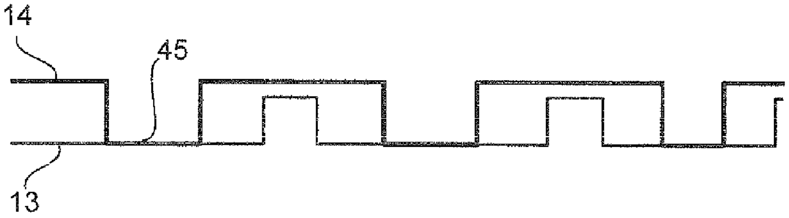
Fig. 4b
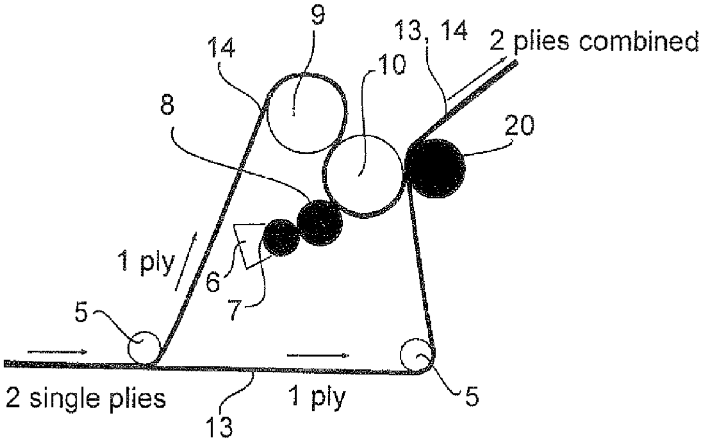
Fig. 5a
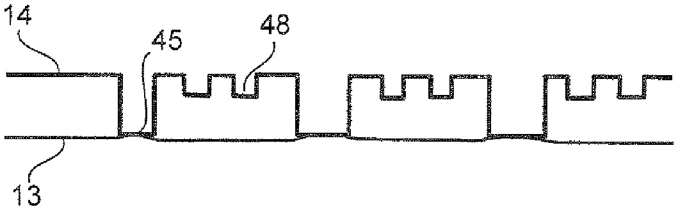
Fig. 5b

APPARATUS AND METHOD FOR PLY BONDING AS WELL AS MULTI-PLY PRODUCT

TECHNICAL FIELD

The present invention relates to the field of ply bonding and particularly to the field of ply bonding without the use of adhesive (glue). More particularly the present invention relates to an apparatus for bonding at least two plies of a fibrous web and a corresponding method. The invention further relates to a hygiene or wiping product comprising at least two plies obtainable by such a method.

The fibrous web may be tissue paper or nonwoven. In the apparatus, method and product of the present invention, plies of the same or a different material may be combined.

A tissue paper is defined as a soft absorbent paper having a low basis weight. One generally selects a basis weight of 8 to 40 g/m2, especially 10 to 25 g/m2 per ply. The total basis weight of multiple-ply tissue products is preferably equal to a maximum of 120 g/m2, more preferably to a maximum of 100 g/$m^2$ and most preferably to a maximum of 55 g/m2. Its density is typically below 0.6 g/cm3, preferably below 0.30 g/cm3 and more preferably between 0.08 and 0.20 g/cm3.

The production of tissue is distinguished from paper production by its extremely low basis weight and its much higher tensile energy absorption index (see DIN EN 12625-4 and DIN EN 12625-5). Paper and tissue paper also differ in general with regard to the modulus of elasticity that characterizes the stress-strain properties of these products as a material parameter.

A tissue's high tensile energy absorption index results from the outer or inner creping. The former is produced by compression of the paper web adhering to a dry cylinder as a result of the action of a crepe doctor or in the latter instance as a result of a difference in speed between two wires ("fabrics"). This causes the still moist, plastically deformable paper web to be internally broken up by compression and shearing, thereby rendering it more stretchable under load than an uncreped paper.

Moist tissue paper webs are usually dried by the so-called Yankee drying, the through air drying (TAD) or the impulse drying method.

The fibers contained in the tissue paper are mainly cellulosic fibres, such as pulp fibers from chemical pulp (e.g. Kraft sulfite or sulfate pulps), mechanical pulp (e.g. ground wood), thereto mechanical pulp, chemo-mechanical pulp and/or chemo-thermo mechanical pulp (CTMP). Pulps derived from both deciduous (hardwood) and coniferous (softwood) can be used. The fibers may also be or include recycled fibers, which may contain any or all of the above categories. The fibers can be treated with additives—such as fillers, softeners, such as quaternary ammonium compounds and binders, such as conventional dry-strength agents or wet-strength agents used to facilitate the original paper making or to adjust the properties thereof. The tissue paper may also contain other types of fibers, e.g. regenerated cellulosic fibres or annual plant fibres such as sisal, hemp or bamboo fibres, or synthetic fibers enhancing, for instance, strength, absorption, smoothness or softness of the paper.

If tissue paper is to be made out of pulp, the process essentially comprises a forming that includes a box and a forming wire portion, and a drying portion (either through air drying or conventional drying on a yankee cylinder). The production process also usually includes the crepe process essential for tissues and, finally, typically a monitoring and winding area.

Paper can be formed by placing the fibers, in an oriented or random manner, on one or between two continuously revolving wires of a paper making machine while simultaneously removing the main quantity of water of dilution until dry-solids contents of usually between 12 and 35% are obtained.

Drying the formed primary fibrous web occurs in one or more steps by mechanical and thermal means until a final dry-solids content of usually about 93 to 97% has been reached. In case of tissue making, this stage is followed by the crepe process which crucially influences the properties of the finished tissue product in conventional processes. The conventional dry crepe process involves creping on a usually 4.0 to 6.5 m diameter drying cylinder, the so-called yankee cylinder, by means of a crepe doctor with the aforementioned final dry-solids content of the raw tissue paper. Wet creping can be used as well, if lower demands are made of the tissue quality. The creped, finally dry raw tissue paper, the so-called base tissue, is then available for further processing into the paper product for a tissue paper product.

Instead of the conventional tissue making process described above, the use of a modified technique is possible in which an improvement in specific volume is achieved by a special kind of drying which leads to an improvement in the bulk softness of the tissue paper. This process, which exists in a variety of subtypes, is termed the TAD (Through Air Drying) technique. It is characterized by the fact that the "primary" fibrous web that leaves the forming and sheet making stage is pre-dried to a dry-solids content of about 80% before final contact drying on the yankee cylinder by blowing hot air through the fibrous web. The fibrous web is supported by an air-permeable wire or belt or TAD-fabric and during its transport is guided over the surface of an air-permeable rotating cylinder drum, the so-called TAD-cylinder. Structuring the supporting wire or belt makes it possible to produce any pattern of compressed zones broken up by deformation in the moist state, also named moulding, resulting in increased mean specific volumes and consequently leading to an increase of bulk softness without decisively decreasing the strength of the fibrous web.

The term non-woven (ISO 9092, DIN EN 29092) is applied to a wide range of products which, in terms of their properties, are located between those of paper (cf. DIN 6730, May 1996) and cardboard (DIN 6730) on the one hand, and textiles on the other hand. As regards non-woven a large number of extremely varied production processes are used, such as the air-laid and spun-laced techniques as well as wet-laid techniques. The non-woven includes mats, non-woven fabrics and finished products made thereof. Non-wovens may also be called textile-like composite materials, which represent flexible porous fabrics that are not produced by the classic methods of weaving warp and weft or by looping. In fact, non-wovens are produced by intertwining, cohesive or adhesive bonding of fibres, or a combination thereof. The non-woven material can be formed of natural fibres, such as cellulose or cotton fibres, but can also consist of synthetic fibres, such as polyethylene (PE), polypropylene (PP), polyurethane (PU), polyester, nylon or regenerated cellulose, or a mix of different fibres. The fibres may, for example, be present in the form of endless fibres of pre-fabricated fibres of a finite length, as synthetic fibres produced in situ, or in the form of staple fibres. The nonwovens according to the invention may thus consist of mixtures of synthetic and cellulose fibrous material, e.g. natural vegetable fibres (see ISO 9092, DIN EN 29092).

The fibrous web may be converted to the final hygiene or wiping product in many ways, for example, by embossing and/or laminating it into a multi-ply product, rolled or folded.

Hygiene or wiping products primarily include all kinds of dry-creped tissue paper, wet-creped paper, TAD-paper (Through Air Drying) and cellulose or pulp-wadding or all kinds of non-wovens, or combinations, laminates or mixtures thereof. Typical properties of these hygiene and wiping products include the reliability to absorb tensile stress energy, their drapability, good textile-like flexibility, properties which are frequently referred to as bulk softness, a higher surface softness and a high specific volume with a perceptible thickness. A liquid absorbency as high as possible and, depending on the application, a suitable wet and dry strength as well as an appealable visual appearance of the outer product's surface are desired. These properties, among others, allow these hygiene and wiping products to be used, for example, as cleaning wipes such as paper or non-woven wipes, windscreen cleaning wipes, industrial wipes, kitchen paper or the like; as sanitary products such as for example bathroom tissue, tissue paper or non-woven handkerchiefs, household towels, towels and the like; as cosmetic wipes such as for example facials and as serviettes or napkins, just to mention some of the products that can be used. Furthermore, the hygiene and wiping products can be dry, moist, wet, printed or pretreated in any manner. In addition, the hygiene and wiping products may be folded, interleaved or individually placed, stacked or rolled, connected or not, in any suitable manner.

Due to the above description, the products can be used for personal and household use as well as commercial and industrial use They are adapted to absorb fluids, remove dust, for decorative purposes, for wrapping or even just as supporting material, as is common for example in medical practices or in hospitals.

To produce multi-ply tissue paper products, such as handkerchiefs, bathroom paper, towels or household towels, an intermediate step often occurs with so-called doubling in which the base tissue in the desired number of plies of a finished product is usually gathered on a common multi-ply mother reel. It is understood that (multi-ply) tissue paper products of different (multi-ply) mother reels can be further combined in subsequent converting steps.

In the final hygiene or wiping product one or more of the fibrous webs may be combined. Thereby webs of the same material, for example tissue paper or nonwoven may be combined or webs of a different material may be combined thereby forming hybrid products. In the latter a tissue paper may be combined with a nonwoven, a doubled fibrous web consisting of tissue paper and nonwoven. In addition, one ply in itself may be a hybrid in regard that different types of fibres (tissue/cellulose fibres and non-woven fibres) are used in one and the same ply. A hybrid product may also be obtained in that tissue paper plies which are manufactured by different methods (for example TAD and conventional) may be combined.

BACKGROUND ART

One of various possibilities to achieve ply bonding between at least two plies of tissue paper without the use of glue is disclosed in WO-A-99/33646. The known device comprises two rollers forming a nip through which at least two plies which are to be bonded are fed. At least the outer periphery of one of the rollers is entirely covered with abrasive material such as the material used for sandpaper so as to achieve an irregular rough surface. This abrasive material is pressed into the nipped plies, whereby ply bonding is achieved.

However, an irregular rough surface structure is imprinted into at least one of the plies over the entire surface. Therefore, the outer appearance of the combined plies is irregular or the ply bonding is (almost) not visible. In addition, it will not be possible to create volume between the plies by embossing and even pre-embossed webs with a defined thickness would be flattened by compressing of the ply.

To enhance the visual appearance of the bonded plies, WO-A-99/33646 additionally suggests a subsequent embossing step. The subsequent embossing requires additional devices with the associated additional steps. This, in turn, increases the complexity of the apparatus and, hence, the manufacturing costs of the final product.

Furthermore, EP-A-1 216 818 discloses an apparatus for bonding at least two plies of a fibrous web comprising a first roller having an outer periphery, a plurality of embossing protuberances being provided on the outer periphery and a second roller having an outer periphery and consisting of rubber at least in the radial direction, the second roller together with the first roller forming a nip through which the at least two plies are to be fed. To achieve ply bonding spikes are either located on top of the embossing protuberances of the first roller or a plurality of spikes are provided on the outer periphery of the second roller. The spikes, however, have the disadvantage that the fibrous web in the area of the spikes is perforated leading to a damage of the fiber structure. In addition, such a perforation and damage is considered detrimental from the view point of visual appearance of the final product. Moreover, the tips of the spikes are subjected to substantial wear by the pressure exerted in the nip resulting in high maintenance work and exchange operations. This, in turn, increases the manufacturing costs of the final product.

Handkerchiefs based on tissue paper are being produced by using foot-to-foot embossing techniques, foot-to-flat embossing techniques or so called Union embossing. In order to achieve mechanical ply-bonding the embossing protuberances of different rollers must match with each other. However, such matching is becoming more and more difficult if the width of the paper roll exceeds approximately 1 m.

Mechanical ply-bonding is also possible by using the so called knurling technique. Knurling is normally been carried out by applying steel-to-steel knurling apparatuses. In order to achieve mechanical ply-bonding, it is necessary to use a lot of knurling stations along the width of the paper roll (e.g. usually up to 26 knurling stations for producing bathroom tissue paper having a width of 2.70 m), thereby increasing the maintenance costs of the ply-bonding process. The resulting tissue products of such a knurling process are characterized by an optical appearance which does not satisfy all consumers demands.

Ply-bonding can also be achieved by using adhesives according to well-known process (goffra incolla, nested, pin-to-pin). However, such ply-bonding by means of adhesives will result in increased production costs and an increased stiffness of the final product depending on the embossing pattern and the dot density.

SUMMARY OF THE INVENTION

In view of the aforesaid, it is, therefore, the object of the present invention to provide an apparatus and a method for bonding at least two plies of a fibrous web (fibrous plies) without the use of adhesive, which enable the visual appearance of the bonded plies to be improved and the overall costs of the final product to be reduced. A further object is to provide a product that compared to the product obtained from a prior art apparatus and method as described above is improved in regard of its visual appearance, bulk (volume) and/or softness. Compared with conventional edge (border) embossing mainly used for hankies and napkins, the resulting product should have an improved ply-bonding even when the width of the paper roll exceeds 1 m. Compared with the knurling technique, the resulting product is characterized by an improved optical appearance especially with large motives.

A further object of the invention is to provide an apparatus and a method for ply-bonding which is characterized by an improved degree of efficiency and an increased rate of production, especially when compared with lamination processes using adhesives.

According to the invention, ply bonding should be carried out without using adhesives such as glue, starch, modified starch or carboxymethylcellulose or without using adhesives based on polymers such as polyvinylacloholes, polyvinylacetates, polyurethanes, polystyrenes or based on polymers comprising acrylic or methacrylic acid.

This object is solved by an apparatus of the present invention as defined in claim 1, a method having the features of claim 18 and a fibrous product according to claim 22.

The basic idea of the present invention is to improve the device and method as disclosed in the prior art in that the known spikes are substituted by additional embossing elements on top or interacting with the embossing protuberances on the first roller so that bonding is achieved only at discrete locations, however, without perforating the fibrous webs but only heavily compressing the plies at discrete locations (locally). Therefore, the disadvantageous damaging and perforating is eliminated thereby enhancing the overall visual appearance. In addition, the ply bonding technique of the invention may be incorporated into existing devices without the need of incorporating additional rollers or other devices or associated equipment thereby reducing high maintenance work and manufacturing costs.

Accordingly, the apparatus of the present invention comprises a first roller having an outer periphery, having at least one embossing protuberance being provided on the outer periphery such first roller being an embossing roller. Here, the embossing protuberance(s) may be arranged irregularly or regularly on the outer periphery providing for a regular background embossing or a decorative embossing in which the discrete embossing protuberance(s) compliment one another to form e.g. a graphic representation (i.e. a dolphin, a flower, a feather etc.). Such embossing rollers can be used for micro, macro, goffra incolla or nested embossing techniques or combinations thereof. Preferably the first roller comprises a plurality of embossing protuberances, however, it is also possible that the first roller comprises just one preferably large protuberance.

In addition, the apparatus of the present invention comprises a second roller having an outer periphery and being elastic at least in a radial direction and together with the first roller forming a nip through which the at least two plies are to be fed. In this context, the second roller is the marrying roller. The second roller should comprise a hard surface based on a flexible and elastic support layer so that the second roller is flexible and reversible regarding deformation. In addition, such second roller should also comprise a core normally made of hard material such as steel. Further, the term “flexible” means that the outer periphery has a certain elasticity, but also includes the case that the outer periphery is subjected to a certain (small) non-reversible deformation. Furthermore, the second roller comprises at least an inner layer and an outer layer, wherein the outer layer is harder than the inner layer. Sufficient compression of the two plies is achieved in the embossing area of the embossing elements, resulting in a sufficient ply bonding.

The apparatus of the present invention should comprise at least one embossing element located either on top of at least one of the embossing protuberances of the first roller and/or on the outer periphery of the second roller. Compared to an embossing protuberance such an embossing element is small in size (especially in view of surface area and height). Preferably an embossing element is characterized by a height less than 50% of the height of the embossing protuberance and most preferably the height of the embossing element is less than 35% of the height of the embossing protuberance. On top of at least one of the embossing protuberances and/or on the outer periphery of the second roller at least one embossing element should be located. However, two, three, four, five and even more embossing elements may be positioned on the top of at least one embossing protuberance of the first roller and two, three, four, five and more embossing elements may be positioned on the outer periphery of the second roller. Preferably at least one embossing element per square centimeter of the surface of the second roller and most preferably at least ten embossing elements per square centimeter of the surface of the second roller may be located on such second roller.

According to a first embodiment, an (at least one) embossing element is located on top of at least one of the embossing protuberance(s) (see FIG. 1). An embossing element in this context is defined as an element imparting an embossing to the ply. For this purpose the embossing has to comprise a surface that is imprinted (pressed) into the ply with the effect of compressing the ply in the area of the surface increasing its density. This differentiates the embossing element from a spike as known from the prior art (e.g. EP-A-1 216 818) because the spike does not compress the plies, but perforates the plies. According to this embodiment, an embossing area of each embossing element, that is the embossing surface, is smaller than the embossing area (surface) of the corresponding embossing protuberance on top of which the embossing element is located. In this embodiment when the two plies are fed through the nip between the first and the second roller, the plies are heavily compressed in between the embossing area of each embossing element and the second roller, whereby the at least two plies are bonded at discrete locations corresponding to the embossing elements.

A typical embodiment of the first alternative of the invention comprises at least one embossing element located on top of an embossing protuberance of the first roller which is an embossing roller. Opposite to the first roller the second roller should be located, such second roller should be the marrying roller (see FIG. 1).

According to an alternative embodiment at least one embossing element is disposed on the outer periphery of the second roller at locations opposite to at least partly of the embossing protuberance(s), wherein an embossing area (surface) of each embossing element is smaller than an embossing area (surface) of the corresponding embossing protuberance. In this alternative embodiment, when the plies are transferred into the nip between the first and second roller, the plies are heavily compressed in between the embossing protuberances of the first roller and the embossing element(s) on the second roller so that the plies are bonded at discrete locations corresponding to the embossing element(s).

A typical embodiment of the second alternative of the invention comprises at lest one embossing element being disposed on the outer periphery of the second roller which is a marrying roller. Opposite to the marrying roller a first roller should be located (see FIG. 2) with at least one embossing protuberance being in a at least partly face to face correlation with the at least one embossing element of the marrying roller.

In a further alternative embodiment, an (at least one) embossing element (first embossing element) is located on top of at least one of the embossing protuberance(s) and at least one embossing element (second embossing elements) is disposed on the outer periphery of the second roller, wherein the first and second embossing elements are disposed on the respective rollers so as to face each other, i.e. at locations opposite to each other. In this embodiment, when the two plies are transferred into the nip between the first and second roller, the plies are heavily compressed between the first embossing element(s) and the corresponding second embossing element(s) so that the plies are bonded at discrete locations corresponding to the first and second embossing elements.

FIG. 3 shows a typical embodiment of the third alternative of the invention comprising at least one embossing element (first embossing element) located on the top of at least one embossing protuberance of the first roller (embossing roller). In addition, at least one embossing element (second embossing element) is disposed on the outer periphery of the second roller and the first and the second embossing elements are positioned in a at least partly face to face correlation.

These features, on the one hand, enable the apparatus to achieve ply bonding between at least two plies of fibrous web which is sufficiently strong to hold the plies together and, on the other hand, enables, in only one device, to obtain an, in regard of the visual appearance, advantageous embossing pattern and achieve ply bonding without perforating the plies. Ply bonding is preferably achieved at those discrete locations, where embossing elements of one roller face embossing elements of embossing protuberances of the other roller. Although such embossing elements are normally characterized by a fairly small surface area resulting in an improved pressure the final multi-ply product still has an alternative optical appearance.

Further, it is possible to provide the first roller with at least two kinds of embossing protuberances, namely first protuberances having a first height in a radial direction of the first roller and second protuberances having a second height in the radial direction of the first roller, the first height being larger than the second height. In this context, the lower protuberances, i.e. second protuberances, may form a regular background pattern and the first protuberances having the larger height may form the aforesaid decorative or graphic pattern. In this particular case, it is preferred that the embossing element is or a plurality of embossing element are disposed on the top surfaces of at least some of the first protuberances only, though it is also possible to provide embossing element (-s) on all protuberances, i.e. the first and second protuberances. It is advantageous, if the ply bonding is not achieved at all, but only at some of the protuberances, because the plies are then shiftable relative to each other in the unbonded areas. This leads to a softer feeling and an increased bulk. As far as the configuration of different kinds of protuberances on the outer periphery of an embossing roller are concerned, the skilled person is referred to for example EP-A-0 765 215.

In one particular embodiment of the present invention, the embossing elements have a planar top surface (opposite to) facing the outer periphery of the first and/or second roller, respectively. The embossing elements may have a curved or round top surface, wherein the minimum radius is about 0.05 mm. Alternatively, they may have a flat top surface (2-dimensional top surface) defining a minimum area of 0.01 $mm^2$. The embossing elements (the embossing surface) may have a circular or elliptical shape or a square, rectangular (linear) or parallelogram shape in plan view. Preferably the height of the embossing elements from either the top surface of the embossing protuberances or the outer periphery of the second roller should be between 0.1 mm and 0.6 mm, preferably between 0.2 mm and 0.5 mm and most preferably between 0.25 mm and 0.4 mm.

According to another preferred embodiment at least some of the embossing elements are linearly shaped. Preferably these embossing elements are rectilinear but may also have a curved linear shape. This configuration leads to a higher mechanical stability of the lines and, therefore, less wear compared to single dots which is another shape the embossing may be formed off (see above).

In the third alternative embodiment described above, in which embossing elements are provided on top of the embossing protuberances of the first roller and the outer periphery of the second roller, it is preferred that, if these embossing elements are formed linearly, they are oriented differently so that at least corresponding first and second linear embossing elements intersect and the ply bonding is primarily achieved at the intersection between the embossing elements. For example, circumferentially arranged linear second embossing elements are located or disposed on the outer periphery of the second roller, wherein axially oriented embossing elements are disposed on top of the embossing protuberances. Also other angular orientations are conceivable. For example, the embossing elements on the second roller may be disposed helically in one direction and the embossing elements on the protuberances of the first roller may be disposed correspondingly (helically), but in the opposite direction.

The second roller may be a rubber roller having at least two rubber layers. However, it is also preferred to use a multilayer rubber roller as described for example in DE-U-20 2007 006 100. The outer surface of the second roller has a preferred hardness of between 80 Shore A and 80 Shore D, especially between 95 Shore A and 70 Shore D. The inner layer of the second roller has a hardness of between 70 Shore A and 70 Shore D, especially between 90 Shore A and 60 Shore D.

Alternatively, it is also conceivable and preferred to use a metal plated rubber roller as the marrying rollers (the second roller), preferably a steel plated rubber roller. The thickness of the metal/steel layer may be in the range between 0.5 to 3 mm, especially between 1 to 2 mm. The metal plated surface may be obtained by helically winding one or more metal belts around a rubber roller. An alternative is to constitute the metal plated surface by one or more tubes fitted over a rubber roller. Another embodiment of the second roller is to provide such a metal plated marrying roller with defined embossing elements on the periphery surface. Such embossing elements are characterized by an area on the top of 0.01 to 1 $mm^2$, preferably of 0.02 to 0.35 $mm^2$ and a height of 0.1 to 0.6 mm, preferably of 0.2 to 0.4 mm. In a preferred embodiment the density of such embossing elements on the periphery may be between 50 and 600 dots/$cm^2$, preferably between 100 and 200 dots/$cm^2$.

One possibility to define the embossing elements on such a metal plated rubber roller is to first constitute a metal plated rubber roller with a planar outer peripheral surface and then selectively etch the outer surface once or a plurality of times after having defined one or more masking operations on the metal surface by for example varnish or selectively removing the varnish by means of a laser. Finally, this surface may be finished by removing the mask formed, by breaking and by sealing the surface by any known method such as chromium plating and/or like.

The rubber used in such rubber rollers may be selected from the group consisting of NR (natural rubber), EPDM (Ethylen-propylen-dien-caoutchouc), NBR (nitrile-butadien-rubber) and PU (polyurethane). The rubber may contain fillers like suede or graphite and other additives like plasticizers. Further additives are catalysts, activators or cross-linking agents. Examples of further fillers are carbon black, silica, caolin, dyes as well as aging inhibitors. The term "rubber roller" should refer to a roller being coated with an elastomeric material such as natural rubber, polyurethane (PU) or similar materials.

It is preferred that the second roller which is a marrying roller has a hardness at the inner periphery between 70 Shore A and 70 Shore D, preferably between 90 Shore A and 60 Shore D, most preferably of between 90 and 99 Shore A.

The hardness of so called elastic materials is in general determined according to the method of Shore (DIN 53505). The hardness of the material in general is a measure for the resistance of this material against the penetration of a harder solid body. In the method according to Shore different devices for determining the hardness are used for softer materials (Shore A) and hard materials (Shore D). This results in two hardness scales for softer materials in the range of 10-98 Shore A and for harder materials in the range of 30-90 Shore D. Suitable devices for measuring the hardness according to Shore A and Shore D are available from Zwick GmbH & Co., Ulm. Thereby conical penetration bodies are pressed against the material to be measured by about 2.5 mm, wherein the force needed for this penetration is measured. Based on the measured force the Shore hardness is calculated.

Moreover, the embossing roller, i.e. the first roller is a metal roller, preferably a steel roller. The embossing roller can be hardened.

To enhance the ply bonding between the at least two plies, it is preferred to provide a discharge device upstream of the first and second rollers to electrically discharge at least one, preferably all plies. In this context, a copper garland may be used which hangs over the fed web constituting the plies. Alternatively, a high voltage discharge device may be used.

In addition, it may be appropriate to enhance the moisture level of the plies to be bonded which, on the one hand, has an advantageous effect with respect to the electrostatic charge of the fibrous plies and, on the other hand, also enhances the strength of the ply bonding. For this purpose, it may be preferred to add a fluid applicator for applying a fluid with polar groups on at least one of the plies upstream of the first and second rollers to increase the water content of the ply. This fluid applicator may be e.g. a roller application system or any kind of a slot nozzle application system. Also steam application or fog application are conceivable. It is preferred that the fluid applicator is configured to apply the fluid on the ply at a plurality of discrete locations so as to increase the fluid content of the ply locally only. In particular, the fluid is applied locally only in the areas in which the two plies are bonded to increase the fluid content only in these areas and improve the bonding strength. This may be achieved by an alternative possibility, namely in that the fluid applicator is configured for applying a fluid on at least some of the embossing protuberances of the first roller upstream of the nip between the first and second rollers to increase the fluid content of the ply locally. The amount of fluid on the ply should reside in the range of 0.1 to 30 g/m$^2$, preferably between 0.2 and 6 g/m$^2$ and more preferably between 0.5 and 3 g/m$^2$.

Suitable fluids with a polar group are e.g. aliphatic or aromatic alcohols, aliphatic or aromatic carbon acids including their ester or amide or anhydride derivatives and aliphatic or aromatic amines including mixtures of such fluids. Preferably water is used as a fluid to be applied onto the ply. It is understood that such fluids should be liquid at such temperature ranges at which ordinary embossing stations are being operated.

However and even more preferred is that the fluid is water based ink. Most of the fibrous web products which are hitherto produced are printed. Therefore, using water based ink for this printing step which in this context is performed upstream of the first and second rollers makes additional devices unnecessary.

In addition to the inventive apparatus, the present invention also suggests a method for bonding at least two plies of tissue paper comprising the steps of: transferring at least two plies into the nip between two rollers, whereby the first roller having an outer periphery and comprising embossing protuberances being located at the outer periphery, the second roller having an outer periphery and being elastic at least in radial direction, such second roller further comprising at least an inner layer and an outer layer, the outer layer being harder than the inner layer, wherein at least one embossing element is located either on top of at least one embossing protuberance, the area of the embossing element(s) being smaller than the area of the corresponding protuberance(s) or located on the periphery of the metal plated second roller, whereby such method further comprises imprinting embossing protuberance(s) and embossing element(s) on at least one of the rollers into at least one of the plies, whereby the plies are bonded together at the discrete locations of the embossing element(s).

Preferably, the embossing element(s) are imprinted in both plies at opposite locations, which may be achieved by the third alternative embodiment of the above described apparatus. In this context and as previously mentioned, it is preferred that the embossing elements are linear and are imprinted so that at least corresponding embossing elements intersect, wherein the ply bonding is achieved at the intersections. In one embodiment, some embossing elements on one ply intersect with a plurality of embossing elements on the other ply.

Further, the present invention also suggests a fibrous product, such as a hygiene or wiping product, obtainable by a method as explained above. The products obtained according to the present invention are characterized by an extraordinary high ply bonding strength if they comprise no or only low amounts of wet strength agents.

Contrary to fibrous tissue products of the prior art such as hankies or knurled toilet papers, whereby the plies are being bonded together by mechanical means without using adhesive, the fibrous products of the present invention are further characterized by a transparency which is different in terms of location onto the protuberances (non-uniform). In addition, the fibrous products of the present invention are characterized by an improved visual appearance.

The fibrous product of the present invention comprises at least two plies of a fibrous web, whereby at least one ply has an embossing pattern of at least one embossing depression (corresponding to the protuberances of the embossing roller), wherein the embossing depression should have a non-uniform transparency. Preferably ply bonding is carried out mechanically and the resulting ply bonding areas of such products have a different transparency compared to the non-ply bonding areas of the embossing depressions.

Further features and advantages as well objects of the present invention will become apparent from the following description of preferred embodiments.

BRIEF DESCRIPTION OF THE DRAWINGS

The description of the particular embodiments of the present invention makes reference to the accompanying drawings in which:

FIG. 4*a* shows a schematic view of an inventive apparatus according to a first embodiment of the present invention and FIG. 4*b* shows a product obtained by using the apparatus of FIG. 4*a;*

FIG. 5*a* shows a schematic view of an inventive apparatus according to a second embodiment of the present invention and FIG. 5*b* shows a product obtained by using the apparatus of FIG. 5*a;*

Throughout the figures the same or equivalent elements are referred to by the same reference numerals.

DETAILED DESCRIPTION OF THE PREFERRED EMBODIMENTS

Figure 1:
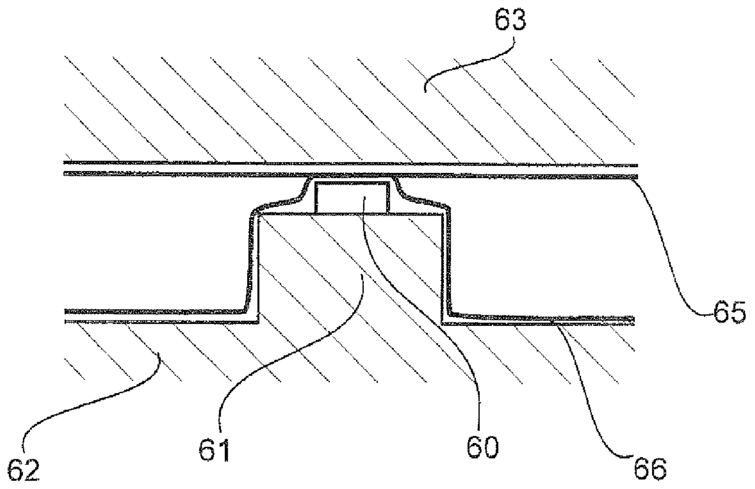
FIGS. 1, 2 and 3 each refer to one specific embodiment of the invention disclosing a part of the inventive apparatus in a schematic way.

FIG. 1 refers to an embodiment according to the first alternative of the invention comprising an embossing element 60 located on top of an embossing protuberance 61 of an embossing roller 62. A marrying roller 63 is located opposite to the embossing roller 62 and between both rollers two plies 65, 66 are position for ply bonding.

Figure 2:
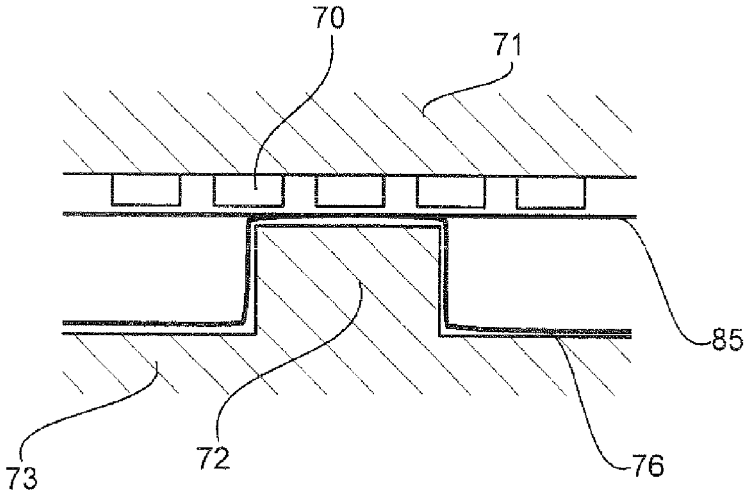

FIG. 2 shows an embodiment according to the second alternative of the invention comprising several embossing elements 70 being disposed on the outer periphery of a marrying roller 71. An embossing protuberance 72 located on the surface of an embossing roller 73 is positioned in a face to face correlation to the embossing elements 70 of the marrying roller 71 and two plies 75, 76 are located between both rollers for ply bonding.

Figure 3:
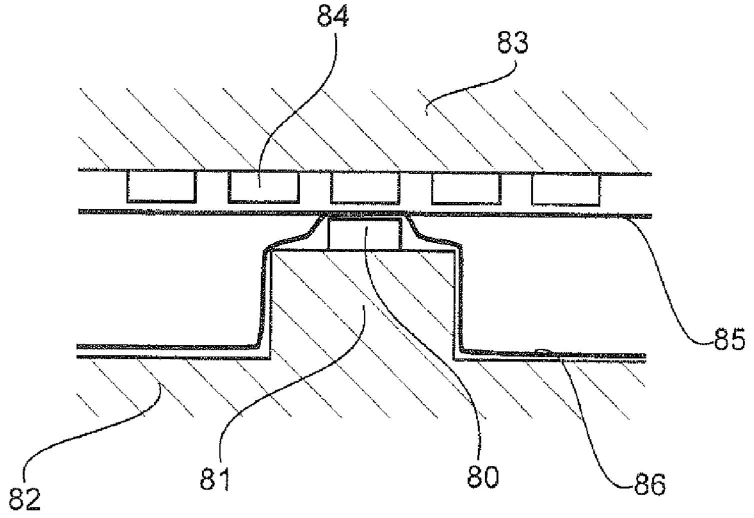

FIG. 3 shows an embodiment according to the third alternative of the invention comprising an embossing element 80 located on top of an embossing protuberance 81 of an embossing roller 82. A marrying roller 83 with embossing elements 84 being disposed on its outer periphery is positioned in a face to face relationship with the embossing roller 82. Two plies 85, 86 are located between both rollers for ply bonding.

FIG. 4 shows an apparatus according to a first embodiment of the present invention. The shown apparatus in its structural features beside the following differences equals an apparatus for embossing and ply bonding in a nested configuration. In regard of these prior art apparatuses reference is made to for example WO-A-2006/136 186.

The inventive apparatus comprises a first roller 10 and a second roller 20.

The first roller 10 is an embossing roller made of steel. The embossing roller comprises a plurality of the embossing protuberances 24 (see FIG. 7) being provided on the outer periphery.

The second roller 20 is a marrying roller and may be formed of rubber the outer periphery being covered by a metal layer thereby forming a metal plated rubber roller.

Additionally, there is provided a counter roller 9 for the embossing roller 10 which is made of rubber.

The apparatus shown in FIG. 4 further comprises a second embossing roller 11 having embossing protuberances on an outer periphery and a counter roller 12 made of rubber. The embossing roller 10 and the embossing roller 11 are associated to each other so that the corresponding embossing protuberances "mesh" (or "nest"). A small gap may be present between the embossing rollers 10 and 11.

An applicator for applying a water based fluid on the one side of one ply is provided in association with the embossing roll 10. This applicator comprises a water based fluid applicator roller 8, an anilox roll 7 and a water based fluid reservoir 6 (doctor chamber). A common fluid applicator may be used to apply the water-based fluid, together with ink onto the ply. Such existing application systems for fluid consisting of an applicator roller, fluid transfer roller and fluid bath can be designed as a so-called immersion roll system in which the fluid transfer roller is immersed into the fluid bath and transports water-based fluid by means of surface tension out of the fluid bath. By adjusting the gap between the fluid transfer roller and the applicator or application roller, the amount of fluid to be applied can be adjusted. Application rollers may be structured rollers. Fluid transfer rollers having defined pit-shaped depressions in their circumferential surface are well-known in the prior art. Such fluid transfer rollers are known as anilox-rollers usually made of ceramic material or made of steel or copper and coated with chromium. Excessive fluid is removed from the surface of the anilox-roller by means of a blade. The amount of fluid is determined by the volume and the number of depressions. Alternative application systems for applying fluid are based on a spraying equipment (Weko-technique).

The two plies are guided through the corresponding roller nips by means of several guide rollers 5. Additionally web tension control systems (not shown) can be useful.

The function of the apparatus as shown in FIG. 4*a* is as follows.

Two single plies are fed to the apparatus and separated at the first guide roller 5, one of the plies (14) being guided around (this is not essential, also other guiding paths are conceivable) the rubber roller 9 and the other (13) being guided via other guide rollers 5 to a nip formed between the second embossing roller 11 and the second counter roller 12. Between this nip a first embossing pattern is imparted to the ply 13. The ply 14 is transferred into the nip between the counter roller 9 and the first embossing roller 10 to form a second embossing pattern on the ply 14.

Then water or a water based ink is taken from the chamber 6 and transferred by means of the anilox roller 7 from the chamber 6 to the applicator roller 8. The applicator roller 8 then transfers the water based fluid (water or water based ink) on the side of the ply 14 which faces the applicator roller 8. Preferable amounts reside within 0.1 to 30 g/m$^2$, especially within 0.2 to 6 g/m$^2$ and most preferably between 0.5 to 3 g/m$^2$. In addition, because of the nipping performed between the rubber roller 9 and the embossing roller 10, only areas of the ply corresponding to the top surfaces of the embossing protuberances on the embossing roller 10 come in contact with the outer periphery of the applicator roller 8 so that only these parts of the ply 14 are moistened or printed by the water based ink. Then both plies 14 and 13 subsequently are bonded in the nip formed between the embossing roller 10 and the marrying roller 20 as described later.

FIG. 4*b* discloses the product obtained by using the apparatus of FIG. 4*a*. Plies 14 and 13 are being bonded together at the top surface of depressions 45 of ply 14 corresponding to the protuberances of the embossing roller. These ply bonding areas are colored because a water-based fluid comprising ink is being applied onto the embossing roller 10. Plies 14 and 13 are being bonded together in a nested configuration.

The embodiment shown in FIG. 5*a* differs from the apparatus shown in FIG. 4*a* in that a so called Goffra Incolla apparatus is used as the basis. This apparatus comprises the same elements as the apparatus in FIG. 4*a* but omits the second embossing roller 11 and its counter roller 12.

In this apparatus the first ply 14 is guided into a nip between the rubber roller 9 and the embossing roller 10, the rubber roller 9 being the counter roller. In this nip there is imparted an embossing pattern on the first ply 14 by the protuberances provided on the outer periphery of the embossing roller 10. The embossing roller 10 has background embossing protuberances of height $h_2$ and décor embossing protuberances of height $h_1$, whereby $h_2<h_1$. As in FIG. 4*a* water or water based ink is applied to the ply 14 in an area corresponding to the top surfaces of the protuberances, wherein a difference in the circumferential speed of the transfer roller and the applicator roller is adjusted to define the amount of water or water-based ink applied on the ply. Subsequently, the first ply 14 and the second ply 13 are brought together in a nip between the embossing roller 10 and a marrying roller 20 as described later.

FIG. 5*b* discloses a two-ply product obtained by using the apparatus of FIG. 5*a*. Plies 14 and 13 are being bonded together at the top surface of depressions 45 of ply 14. Ply 14 comprises smaller depressions 48 which do not contribute to the ply bonding because these depressions 48 are of reduced depths compared with the depressions 45.

Figure 6A:
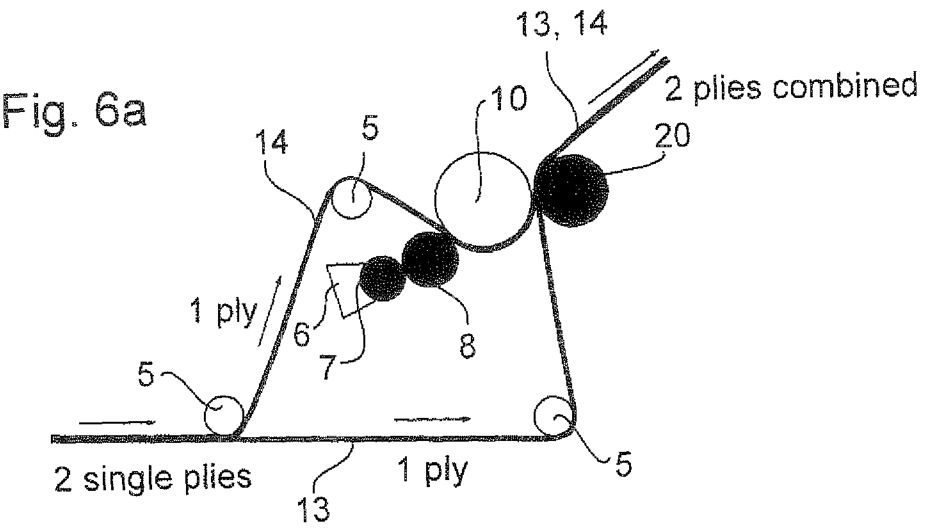
FIG. 6*a* shows a schematic view of an inventive apparatus according to a third embodiment of the present invention and FIG. 6*b* shows the respective product.

An alternative apparatus is shown in FIG. 6*a*. Compared to the apparatus shown in FIG. 5*a* the apparatus of FIG. 6*a* omits the rubber roller 9.

Instead the first ply 14 is transferred into the nip between the applicator roller 8 and the embossing roller 10 to apply the water based fluid on the side of the ply 14 mainly in the areas corresponding to the top surface of the protuberances of the embossing roller 10. Then, the second ply 13 together with the first ply 14 are being transferred into the nip and bonded between the embossing roller 10 and the marrying roller 20, ply bonding is achieved in the areas corresponding to the top surfaces of the embossing protuberances. There is no or only a slight embossing achieved.

Figure 6B:
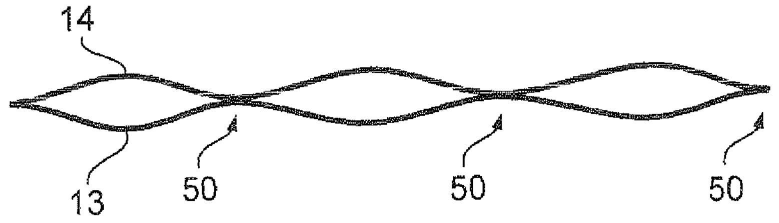

FIG. 6*b* discloses a two ply product obtained by using the apparatus of FIG. 6*a*. Plies 14 and 13 are being bonded together at areas 50 which do not show the typical shape of embossing depressions because neither ply 14 nor ply 13 is characterized by an embossing pattern.

In all of the embodiments, the embossing elements 23 and 25 may either be disposed on the embossing roller 10 or the marrying roller 20, respectively. These embossing elements 23, 25 are provided on both rollers 10, 20. That is referring to FIG. 7 first embossing elements 25 are located on the top surfaces of the embossing protuberances 24 (one element 25 on each or at least some protuberances 24) and further second embossing elements 23 are located on the outer periphery of the marrying roller 20. The marrying roller 20 is preferably made of a rubber coated steel core 22 being metal plated by a metal layer 21 which may either be achieved by helically winding a metal belt around the rubber coated steel core 22 or by fitting a tube made of metal over rubber layer 27 surrounding the core 22. The embossing elements 23 may be etched out of the metal layer 21.

Figure 7:
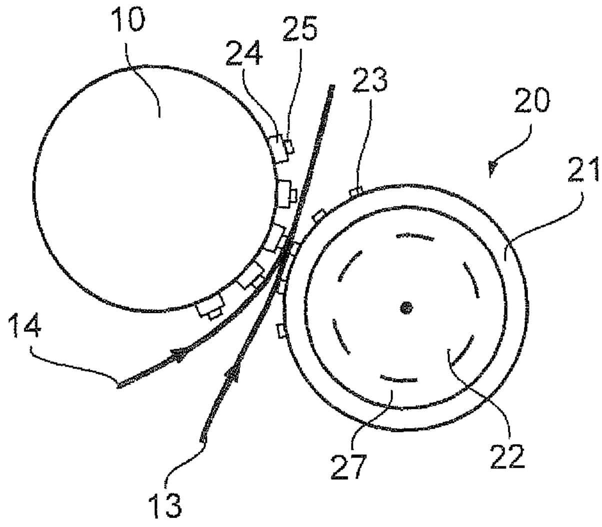
FIG. 7 shows an enlarged view of a configuration of the rollers 10, 20 in FIGS. 4 to 6 in a side view.

As may be derived from FIG. 7, the embossing elements 23, 25 are disposed on the respective rollers at corresponding locations so that the embossing elements 23, 24 face each other and compress the two plies 13, 14 in between to obtain the ply bonding. In particular, both plies 13 and 14 are fed into the nip between the embossing roller 10 and the marrying roller 20. In this nip, the two plies 13, 14, which also may be referred to as webs, are compressed in the area of the top surfaces or embossing surfaces of the embossing elements 23, 25 and compressed so as to achieve the ply bonding (e.g. if the marrying roller has a diameter of 260 mm and the embossing roller 10 has a diameter of 280 mm, a nip of 8-10 mm is adjusted, the marrying roller having a rubber hardness of 95 Shore A and a 1.5 mm thick steel band). So the ply bonding is only achieved in these areas, where the embossing elements 23 and 25 face each other.

Figure 8:
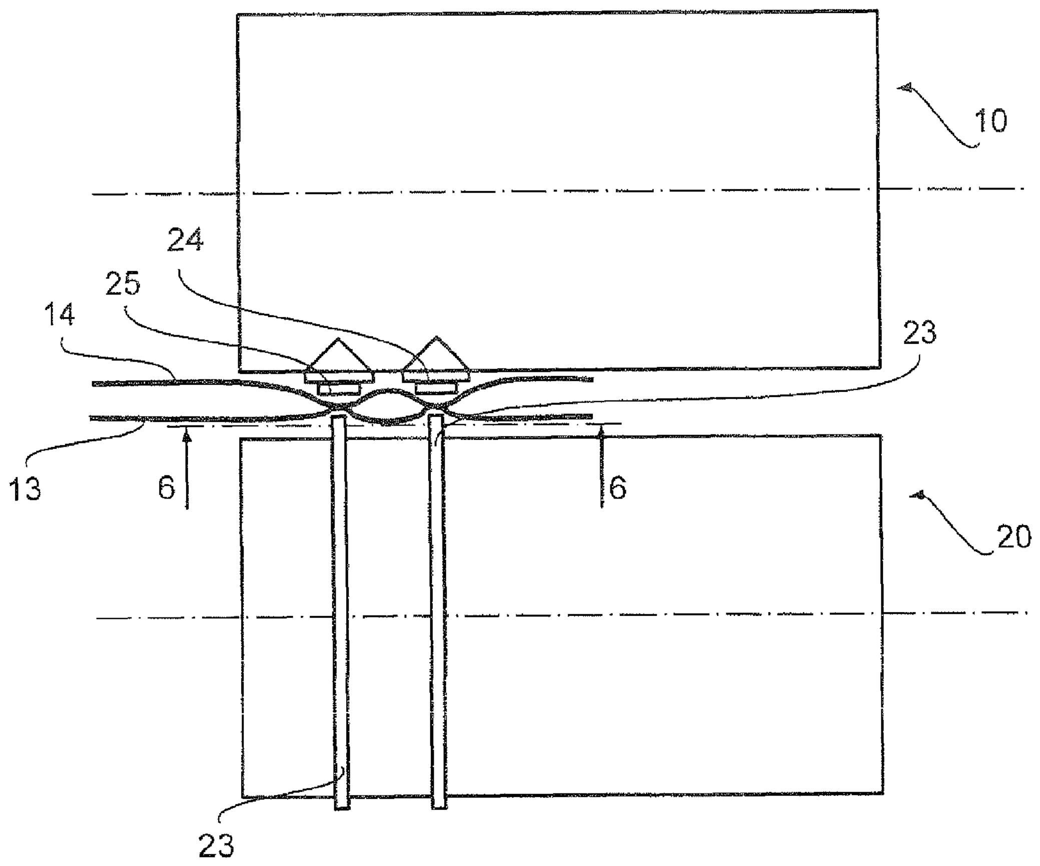
FIG. 8 shows an embodiment in which the embossing elements on the first roller 10 and the second roller 20 are formed linearly.
Figure 9:
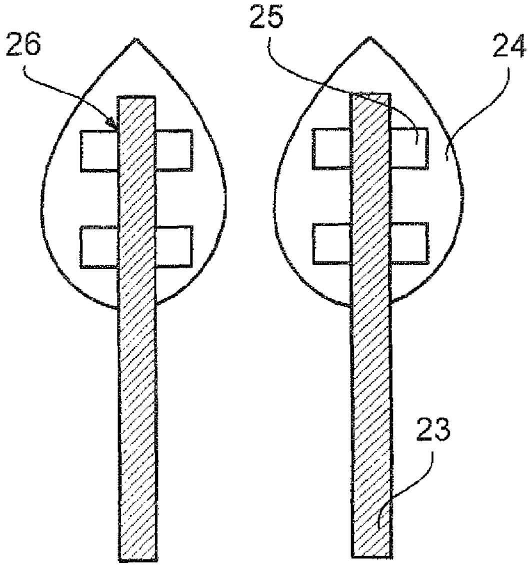
FIG. 9 shows a cross-section along the line 6-6 in FIG. 8 crossing linearly and circumferentially extending embossing elements on the second roller 9, 20.

An alternative configuration of the embossing elements 23, 25 is shown in FIGS. 8 and 9. In this embodiment rectilinear and with respect to the roller 20 circumferentially arranged embossing elements 23 are disposed on the marrying roller 20.

The embossing elements 23 extend about the entire outer circumference of the roller and are spaced apart in an axial direction. In this embodiment a height of the embossing elements 23 may be 0.3 mm, wherein the thickness of the metal layer 21 is about 1.5 mm.

Furthermore, embossing protuberances 24 are provided on the embossing roller 10, which in this embodiment are macro-embossing elements in the shape of leaves. On the top surfaces of the leaf-shaped embossing protuberances 24, i.e. on their embossing surfaces, rectilinear embossing elements 25 (here two elements 25 on each protuberance 24) are disposed. These rectilinear embossing elements 25 are arranged axially with respect to the embossing roller 10. Hence, in operation and in the view of FIG. 9 which is another view of the embossing elements 23 and 25, the elements 23 and the elements 25 intersect, wherein the embossing elements 23 intersect a plurality of embossing elements 25. The intersection in FIG. 9 is indicated by the reference numeral 26. In this embodiment embossing the ply 13, 14 between the rollers 10 and 20, results in a heavy compression of such plies in the area of the intersection 26 so as to obtain ply bonding at these intersecting locations only.

Subsequently, both plies being combined are further transferred to other processing steps, if required and may be converted to a final product (not shown here).

It is to be understood that the present invention is not limited to the above described embodiments. In particular, it is conceivable to either provide the embossing elements 23, 25 on the embossing roller 10 or the marrying roller 20 or on both of these rollers. In addition, it is conceivable that the embossing elements 23, 25 have the same or a different shape and that the embossing elements 23 are larger or smaller in regard of their embossing area with respect to the other embossing elements 25 as long as the embossing elements are smaller in regard of their embossing area compared to the embossing area of the embossing protuberances 24. In addition, the embossing elements 23, 25 may have a circular or oval shape but may also be formed in form of a square, a rectangular (linear) or a parallelogram.

The invention claimed is:

1. Apparatus for bonding at least two plies of a fibrous web, comprising:

a first roller having an outer periphery, at least one embossing protuberance being provided on the outer periphery; and a second roller having an outer periphery and being elastic at least in a radial direction, the second roller comprising at least an inner layer and an outer layer that is harder than the inner layer, the second roller together with the first roller forming a nip through which the at least two plies are to be fed, wherein an embossing element is located on top of the at least one embossing protuberance, an embossing area of the embossing element being smaller than an embossing area of the at least one embossing protuberance, and the embossing element presses the at least two plies against the most radially outward surface of the second roller or of the first roller so that the at least two plies are bonded at a discrete location corresponding to the embossing element, the embossing element being smaller in height than the at least one embossing protuberance.

2. The apparatus as set forth in claim 1, comprising a plurality of embossing protuberances, at least one first protuberance having a first height in a radial direction of the first roller and at least one second protuberance having a second height in the radial direction of the first roller, the first height being larger than the second height, and embossing elements are disposed on the top surface of at least one of the first protuberances.

3. The apparatus as set forth in claim 1, wherein the embossing element has a planar top surface facing the outer periphery of the first roller or the second roller.

4. The apparatus as set forth in claim 1, wherein the embossing element is linearly shaped.

5. The apparatus as set forth in claim 1, wherein the second roller is a rubber roller having at least two rubber layers, an outer harder layer and an inner softer layer.

6. The apparatus as set forth in claim 1, wherein the second roller is a metal plated rubber roller.

7. The apparatus as set forth in claim 5, wherein the rubber is selected from the group consisting of NR, EPDM, NBR and PU.

8. The apparatus as set forth in claim 1, wherein the second roller has an inner periphery, and a hardness at the inner periphery is between 70 Shore A and 70 Shore D.

9. The apparatus as set forth in claim 6, wherein the embossing element is located either on the at least one embossing protuberance or on the surface of the metal plated rubber roller and has a size of between 0.01 $mm^2$ and 2 $mm^2$, a height of between 0.01 mm and 0.6 mm and a density of between 50 dots/$cm^2$ and 600 dots/$cm^2$.

10. The apparatus as set forth in claim 1, further comprising at least one discharge device upstream of the first and second rollers.

11. The apparatus as set forth in claim 1, further comprising a fluid applicator for applying a fluid on at least one of the plies upstream of the nip between the first and second rollers to increase the water content of the at least one ply.

12. The apparatus as set forth in claim 11, wherein the fluid applicator is configured to apply the fluid on the at least one ply at a plurality of discrete locations corresponding to locations of a plurality of embossing elements so as to increase the fluid content of the at least one ply locally.

13. The apparatus as set forth in claim 12, wherein the fluid is water or water based ink.

14. A method of bonding at least two plies of a fibrous web utilizing the apparatus as set forth in claim 11, wherein a plurality of embossing elements are imprinted in both plies at opposite locations.

15. The method as set forth in claim 14, wherein the embossing elements are linear and are imprinted so that at least corresponding embossing elements intersect.

16. The method as set forth in claim 14, wherein some embossing elements on one ply intersect with a plurality of embossing elements on the other ply.

17. Fibrous product obtainable by a method according to claim 14.

18. The apparatus as set forth in claim 8, wherein the second roller has a hardness at the inner periphery between 90 Shore A and 60 Shore D.

19. The apparatus as set forth in claim 1, a length of the embossing element in a circumferential direction of the either the first roller or the second roller is less than a length of the at least one protuberance in the circumferential direction of the first roller, and the radially-most outer surface of the embossing element is planar.

* * * * *